United States Patent Office 3,701,832
Patented Oct. 31, 1972

3,701,832
METHOD OF INHIBITING DOPAMINE
β-HYDROXYLASE
Curt C. Porter, Glenside, Pa., assignor to
Merck & Co., Inc., Rahway, N.J.
No Drawing. Filed Nov. 19, 1969, Ser. No. 878,179
Int. Cl. A61k 27/00
U.S. Cl. 424—273                                    4 Claims

ABSTRACT OF THE DISCLOSURE

Method of inhibiting dopamine β-hydroxylase which comprises the administration to a host of a therapeutically-effective amount of a mercaptoimidazole or a mercaptobenzimidazole.

---

This invention relates to a method of inhibiting dopamine β-hydroxylase in patients (animal or human) utilizing novel pharmaceutical compositions containing mercaptans.

This invention further relates to a method of inhibiting alcohol metabolism in patients (animal or human) utilizing novel pharmaceutical compositions containing mercaptans.

More particularly, this invention relates to the inhibition of dopamine-β-hydroxylase, an enzyme occurring in nerve tissue (central and peripheral) and in the adrenal medulla, which catalyses the conversion of 3,4-dihydroxyphenethylamine (Dopamine) to norepinephrine. As a consequence of inhibiting this enzyme in vivo, the rate of peripheral tissue norepinephrine synthesis is reduced, thereby resulting in decreased cardiac sympathetic stimulation. Centrally, norepinephrine concentrations are reduced while dopamine concentrations are elevated, resulting in decreased activity in nonadrenergic neural pathways and increased activity in dopaminergic neural pathways. Furthermore, the mercaptans of this invention are useful in the treatment of alcoholism as they act on the enzymes which normally oxidize alcohol in the body thereby inhibiting the metabolic degradation of alcohol in the body.

Still more particularly, this invention relates to pharmaceutical compositions having as an active ingredient compounds of the formula:

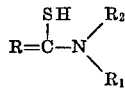

in which:

R may be hydrogen, loweralkenyl, cycloloweralkenyl, aryl, substituted aryl, aralkyl, heterocyclic, substituted heterocyclic, amino, substituted amino of the formula

and

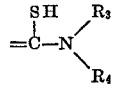

and
$R_1$, $R_2$, $R_3$ and $R_4$ each may be hydrogen, loweralkyl, aryl or heterocyclic and wherein R and $R_1$ may be joined to form a heterocyclic compound of less than 20 carbon atoms.

As used above the term loweralkyl means up to 16 carbon atoms; the term cycloloweralkyl includes up to 8 carbon atoms; the term aryl includes benzyl, phenyl and naphthyl; the term substituted aryl includes mono-, di-, and tri-substituted aryl groups wherein the substituents may be halo (chloro, fluoro, bromo), loweralkyl (methyl, ethyl, propyl) or halosubstituted loweralkyl; the term aralkyl includes phenethyl, phenylpropyl and phenylbutyl; the term heterocyclic includes thienyl, furyl, pyrrolyl, imidazolyl, pyridyl, pyrazolyl, etc.; and the heterocyclic groups may be alkyl or halo substituted. When R and $R_1$ are joined to form a heterocyclic compound, heterocycles and substituted heterocycles such as pyrazoles, imidazoles, pyrrolidines, pyrroles, piperidines, pyridines, pyridazines, pyrimidenes and benzimidazoles may be formed.

It is to be understood that other substituents such as alkoxy, alkenyl, haloalkyl, etc. and heterocyclic groups such as indolyl, indenyl, etc. are considered within the scope of this application in that they are functionally equivalent to the above enumerated groups.

The compounds useful in the compositions of this invention may be prepared by well-known prior art methods as for example, by the procedures disclosed on pp. 139–140 of Organic Chemistry, Reinhold Publishing Company, 1956.

A preferred embodiment of this invention is a method of inhibiting dopamine β-hydroxylase which comprises the administration of a therapeutically effective amount of the compounds of the above formula. In general the daily dose can be from 0.05 mg./kg. to 500 mg./kg. per day and preferably from 1 mg./kg. to 250 mg./kg. per day, bearing in mind, of course, that in selecting the appropriate dosage in any specific case, consideration must be given to the patient's weight, general health, metabolism, age and other factors which influence response to the drug.

Another embodiment of this invention is the provision of pharmaceutical compositions in dosage unit form which comprise from about 1 mg. to 1 g. of a compound of the above formula.

Still another preferred embodiment of this invention is a method of inhibiting alcohol metabolism which comprises the administration in dosage unit form of from 0.05 mg./kg. to about 500 mg./kg. per day and preferably from 1 mg./kg. to 250 mg./kg. per day of a compound of the above formula.

Some of the more preferred compounds utilized in the methods and compositions of this invention are 2-mercaptobenzimidazole, 2 - mercapto - 5,6-dimethylbenzimidazole, 1 - methyl - 2 - mercaptoimidazole and 2-mercaptopyridine.

The pharmaceutical compositions may be in a form suitable for oral use, for example, as tablets, aqueous or oily suspensions, dispersible powders or granules emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the active ingredient in admixture with non-toxic pharmaceutically acceptable excipients which are suitable for manufacture of tablets. These excipients may be, for example, inert diluents, for example calcium carbonate, sodium carbonate, lactose, calcium phosphate or sodium phosphate; granulating and disintegrating agents, for example maize starch, or alginic acid; binding agents, for example starch, gelatine or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period.

Formulations for oral use may also be presented as hard gelatine capsules wherein the active ingredient is mixed with an inert solid diluent, for example calcium carbonate, calcium phosphate or kaolin, or as soft gelatine capsules wherein the active ingredient is mixed with an oil medium, for example arachis oil, liquid paraffin or olive oil.

Aqueous suspensions contain the active mercaptans in admixture with excipients suitable for the manufacture of aqueous suspensions. Such excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxycetanol, or condensation products of ethylene oxide with partial esters derived from fatty acids and a hexitol, for example polyoxyethylene sorbitol monooleate, or condensation product of ethylene oxide with partial esters derived from fatty acids and hexitol anhydrides, for example polyoxyethylene sorbitan monooleate. The said aqueous suspensions may also contain one or more preservatives, for example ethyl, or n-propyl, p-hydroxy benzoate, one or more coloring agents, one or more flavoring agents and one or more sweetening agents, such as sucrose, saccharin, or sodium or calcium cyclamate.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example, sweetening, flavoring and coloring agents, may also be present.

Syrups and elixirs may be formulated with sweetening agents, for example glycerol, sorbitol or sucrose. Such formulations may also contain a demulcent, a preservative and flavoring and coloring agents. The pharmaceutical compositions may be in the form of a sterile injectable preparation, for example as a sterile injectable aqueous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1,3-butane diol.

The pharmaceutical compositions may be tableted or otherwise formulated so that for every 100 parts by weight of the composition there are present between 5 and 95 parts by weight of the active ingredient and preferably between 25 and 85 parts by weight of the active ingredient. The dosage unit form will generally contain between about 100 mg. and about 500 mg. of the active ingredient of the formula stated above.

From the foregoing formulation discussion it is apparent that the compositions of this invention can be administered orally or parenterally. The term parenteral as used herein includes subcutaneous injection, intravenous, intramuscular, or intrasternal injection or infusion techniques.

This invention is further demonstrated by the following examples in which all parts are by weight.

EXAMPLE 1

A mixture of 250 parts of 2-mercaptobenzimidazole and 25 parts of lactose is granulated with suitable water and to this is added 100 parts of maize starch. The mass is passed through a 16-mesh screen. The granules are dried at a temperature below 60° C. The dry granules are passed through a 16-mesh screen and mixed with 3.8 parts of magnesium stearate. They are then compressed into tablets suitable for oral administration according to the method of this invention.

EXAMPLE 2

A mixture of 50 parts of 2 - mercapto-5,6-dimethylbenzimidazole, 3 parts of the calcium salt of lignin sulfonic acid, and 237 parts of water is ball-milled until the size of substantially all the particles of 2-mercapto-5,6-dimethylbenzimidazole is less than 10 microns. The suspension is diluted with a solution containing 3 parts of sodium carboxymethylcellulose and 0.9 part of the butyl ester of p-hydroxybenzoic acid in 300 parts of water. There is thus obtained an aqueous suspension suitable for oral administration for therapeutic purposes.

EXAMPLE 3

A mixture of 250 parts of 1-methyl-2-mercaptoimidazole, 200 parts of maize starch and 30 parts of alginic acid is mixed with a sufficient quantity of a 10% aqueous paste of maise starch and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 4

A mixture of 500 parts of 2-mercaptopyridine, 60 parts of maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

What is claimed is:

1. A method of inhibiting dopamine β-hydroxylase which comprises administering to a host requiring the inhibition of dopamine β-hydroxylase a therapeutically effective amount of a compound selected from the group consisting of 2-mercaptobenzimidazole, 2-mercapto-5,6-dimethylbenzimidazole, and 1-methyl-2-mercaptoimidazole.

2. A method as in claim 1 wherein the therapeutically effective amount is from about 1 to 250 mg./kg. per day.

3. A method as in claim 1 wherein the compound being administered is 2-mercaptobenzimidazole.

4. A method as in claim 1 wherein the compound being administered is 1-methyl-2-mercaptoimidazole.

References Cited

UNITED STATES PATENTS 3,471,508  10/1969  Sarett et al. _____ 424—273

OTHER REFERENCES

Mezentseva: Chem. Abst., vol. 71 (1969), p. 48179h.
Zapadnyuk: Chem. Abst., vol. 57 (1962), p. 2341h.

SAM ROSEN, Primary Examiner